United States Patent Office 3,250,734
Patented May 10, 1966

3,250,734
HYDROXY INTERPOLYMERS PREPARED FROM PARTIALLY ESTERIFIED CARBOXYL INTERPOLYMERS AND MONO-1,2-EPOXIDES
Kazys Sekmakas, Chicago, Ill., assignor to DeSoto Chemical Coatings, Inc., Chicago, Ill., a corporation of Delaware
No Drawing. Filed Oct. 10, 1962, Ser. No. 229,743
18 Claims. (Cl. 260—23)

The present invention relates to non-gelled, solvent-soluble hydroxy copolymers and the production thereof and to heat-curable organic solvent solution coating compositions containing the same which cure to form coatings having excellent hardness, flexibility, gloss, durability, adhesion to metal substrates, resistance to soaps, detergents, grease and other chemicals. As a feature of the invention, these heat-curable compositions are formed in a manner providing far superior storage stability.

Hydroxy copolymers, in the present development of the art, have achieved little success. The hydroxy-containing monomers are expensive, copolymers containing the same are not adequately plasticized so that flexible coatings are unduly soft and hard coatings are unduly brittle, and heat-curable systems containing the copolymers are partially reactive at room temperature and the coating solutions become viscous and tend to gel upon storage.

The present invention proposes a critical system which overcomes the above inadequacies to a considerable extent.

In accordance with the invention, maleic anhydride is copolymerized with ethylenically unsaturated material copolymerizable therewith to form an anhydride copolymer. This anhydride copolymer is then half esterified with an alcohol and the secondary carboxyl group of the half ester is related with a monoepoxide to generate an hydroxy ester. Reaction with alcohol must precede or accompany the reaction with monoepoxide. In this way, the original anhydride copolymer is converted into an internally plasticized hydroxy copolymer which is highly reactive with aminoplast resins and polyepoxides, despite the fact that monoepoxides, with the exception of ethylene oxide, are known to yield secondary hydroxyl groups in major proportion upon reaction with carboxylic acids. Curiously, and despite the highly reactive copolymer product which is produced, the hydroxy copolymer formed by reaction with monoepoxide is organic solvent-soluble and non-gelled.

While the highly reactive hydroxy copolymers are highly useful, solution coating compositions containing the same in admixture with other reactive materials have only limited storage stability. Surprisingly, remarkably improved storage stability is achieved when the esterification of the anhydride copolymer is carried out in the presense of an alkali metal fatty acid soap, and any alkalinity introduced in this way is eliminated by the addition of an inorganic acid.

In the present invention, maleic anhydride is copolymerized with other ethylenically unsaturated materials to form an anhydride copolymer which is reacted with an alcohol and a monoepoxide to form valuable hydroxy copolymers. This may be contrasted with other possible procedures as follows.

Referring to Example 1 presented hereinafter, a valuable non-gelled solvent-soluble hydroxy copolymer is produced containing 39.5% of vinyl toluene, 29.5% of ethyl acrylate and the remaining 31.0% being maleic anhydride, n-butanol and propylene oxide. In contrast, the attempted copolymerization under the conditions of Example 1, of 39.5% vinyl toluene, 29.5% of ethyl acrylate and 31.0% of hydroxy propyl butyl maleate (formed by heating 1 mol maleic anhydride with 1 mol of n-butanol for 1 hour at 350° F. followed by esterification with 1 mol of 1,3-propylene glycol at 325–330° F. for 14 hours to an acid value of 15) results in an insoluble and useless gel. The same useless results are obtained when 1,3-propylene glycol is replaced by ethylene glycol or 1,2-propylene glycol.

Similarly, one cannot merely esterify maleic anhydride with glycol for this leads to the production of a mixture of unsaturated linear polyester, diester, monoester and unreacted glycol.

Still another possible approach is to form the anhydride copolymer and esterify this with two equivalents of 1,3-propylene glycol per equivalent of maleic anhydride in the preformed copolymer. Again, the result of heating the maleic anhydride-vinyl copolymer with the glycol at 340° F. is an insoluble gel, apparently due to the formation of cross-linked polyester.

In the same manner, reaction of the preformed anhydride copolymer with a mixture of glycol and monoepoxide leads to an insoluble gel.

One may even attempt to copolymerize the 1,3-propylene glycol diester of maleic anhydride with the other vinyl monomers of Example 1, but the result is, again, an insoluble gel.

Any attempt to duplicate the invention by using glycol instead of monoepoxide requires reaction conditions in which water of esterification is removed and also produces a gel.

Indeed, if the preformed anhydride copolymer is reacted with monoepoxide in the absence of available alcohol to block one of the carboxyl functionalities of the anhydride groups, the result is, once again, an insoluble gel.

Referring more particularly to the present invention, a maleic anhydride is copolymerized with ethylenically unsaturated material copolymerizable therewith to form an anhydride copolymer.

The term "a maleic anhydride" identifies unsaturated anhydrides having the formula:

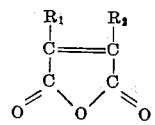

in which $R_1$ and $R_2$ are selected from the group of hydrogen, alkyl, aryl and aralkyl radicals containing up to 8 carbon atoms, and halogen. Thus, maleic anhydride, methyl maleic anhydride, phenyl maleic anhydride, dimethyl maleic anhydride and chlormaleic anhydride are particularly contemplated. Maleic anhydride is preferred.

The maleic anhydride component is incorporated in the interpolymer in an amount of from 2–50%, preferably in an amount of from 5–30%, based on the weight of the interpolymer.

Any ethylenically unsaturated material copolymerizable with maleic anhydride may be used, especially styrene, vinyl toluene and other vinyl aromatic compounds such as alpha-methyl styrene, and other $C_1$–$C_4$ alkyl styrenes such as isopropenyl toluene, the dialkyl styrenes such as dimethyl styrene, and the halo-styrenes such as monochloro styrene, and methyl methacrylate. Since the anhydride copolymer is to be reacted with a monohydric alcohol, especially with alcohols containing at least two carbon atoms, preferably at least four carbon atoms, providing internal plasticization, large proportions of these hardening monomers may be used. Desirably, the interpolymers also include from 20–45% by weight of acrylate esters and methacrylate esters having two or more carbon atoms in the esterifying alcohol. Preferred monomers of this latter type are ethyl acrylate, butyl acrylate, 2-ethyl hexyl acrylate and butyl methacrylate.

Desirably, the ethylenically unsaturated material contains the $CH_2=C<$ group and other monomeric compounds of this class are illustrated by acrylonitrile, n-butyl vinyl ether, crotonic acid esters, and vinyl chloride or vinyl acetate.

When the ethylenically unsaturated material is monomeric, it is desirably selected to be free of any functional group capable of reaction with the oxirane group. On the other hand, polymeric unsaturated compounds may contain acidic or basic functionality, but these are too sluggish to interfere. Thus, one may incorporate 5% or more of unsaturated polyester resin containing from 0.005 to 0.40 gram mol of ethylenically unsaturated component per 100 grams of polyester, especially polyesters in which the unsaturation in the polyester is substantially confined to side chains in the polyester structure as by the use of a monoethylenically unsaturated monofunctional component such as crotonic acid or allyl alcohol in an amount to provide from 0.03–0.3 gram mol of unsaturated component per 100 grams of polyester. The unsaturated polyester resin may contain residual carboxyl or hydroxyl functionality. Indeed, it may contain either functionality in moderate excess over the other.

The interpolymers of the invention are desirably produced by a single stage solution copolymerization in which the monomers are dissolved in an organic solvent which is also a solvent for the interpolymer which is formed and copolymerization is effected in the presence of a free-radical generating polymerization catalyst, elevated temperatures being normally used to speed the reaction.

Preferably, the monomers are dissolved in the organic solvent which is introduced into the reaction vessel slowly and at a uniform rate (desirably by continuous addition) to permit more precise control of the reaction and to provide a more uniform interpolymer product. Also, continuous monomer addition enables temperatures control during the reaction despite the highly exothermic reaction which normally occurs.

Chain terminating agents, such as mercaptans, may be used to exert their known effect of lowered average molecular weight.

Any free-radical generating polymerization catalyst may be used, the selection of catalyst being determined by the desired temperature of the polymerization reaction. The important point is that the agent liberate free radicals under the conditions of polymerization so that the addition polymerization is facilitated. The class of catalysts under consideration is too well known to require extensive discussion, the examples illustrating suitable materials.

The particular nature of the organic solvent used for the solution copolymerization or for the solvent solution application of the interpolymers or mixtures containing the same is not a critical aspect of the invention. Butanol, preferably in admixture with xylol, is a preferred solvent system, but the invention is not limited to specific solvents since many others are available and useful, such as toluene, methyl ethyl ketone, methyl isobutyl ketone, acetone, butyl acetate, 2-ethoxy ethanol, 2-butoxy ethanol, etc.

The preformed anhydride copolymer must then be partially esterified with monohydric aliphatic organic compound containing the single hydroxyl group as the sole functional group thereof. Alcohols and ether alcohols are preferred, such as ethanol, butanol, isooctyl alcohol, 2-ethoxy ethanol, 2-butoxy ethanol, the methyl, ethyl or butyl ethers of diethylene glycol, etc. Aromatic substituted aliphatic alcohols may be used, such as benzyl alcohol. Even unsaturated alcohols may, less desirably, be used such as allyl alcohol and the alcohols corresponding to drying oil fatty acids.

Partial esterification of the anhydride copolymer is desirably effected to 100% of half esterification, e.g., the conversion of all of the anhydride groups into monoesters with accompanying generation of a secondary carboxyl group. As is well known, in the presence of excess alcohol, and in the absence of unusual reaction conditions, such as high temperature, removal of water, or catalysis, all of the anhydride groups react and the secondary carboxyl groups are substantially unreacted.

Before discussing the partial esterification in greater detail, it is essential that monoepoxide not be present in the absence of alcohol because this leads to the production of insoluble cross-linked polymers. On the other hand, the sequential reaction of alcohol and then monoepoxide may be effected in two separate stages or simultaneously in a single state.

In the presence of alcohol, the alcohol reacts preferentially with the anhydride group and the monoepoxide reacts preferentially with the secondary carboxyl group, providing an automatic check on the reaction. Interestingly, both reactions generate no water of esterification, simplifying the reaction and the failure to remove water provides a further control over the course of the reaction.

By the use of a deficiency of alcohol, some of the anhydride groups may remain unreacted, though it is preferred to react them all. At least 50%, and preferably at least 90%, of the anhydride groups should be reacted with alcohol in accordance with the invention.

With excess alcohol, catalysts or vigorous reaction conditions including water removal and using a two-stage procedure, some of the secondary carboxyl groups may be esterified with alcohol. Though this is not preferred, the esterification with alcohol of up to 50%, preferably less than 10%, of the secondary carboxyl groups may be tolerated. Thus, up to 150% of half esterification may be effected by the alcohol.

The copolymer which is now internally plasticized by alcohol partial esterification and which contains secondary carboxyl groups is reacted with monoepoxide (the two reactions may be effected in two separate stages or concurrently as indicated hereinbefore) to produce an hydroxy ester. Any monoepoxide having a single oxirane group

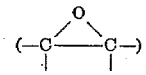

as the sole function group thereof may be used.

Suitable monoepoxides are illustrated by ethylene oxide, propylene oxide, butene-2-oxide, phenyl glycidyl ether, isopropyl glycidyl ether, styrene oxide, etc. With the exception of ethylene oxide, the literature indicates that the preponderance of the hydroxyl groups formed by the reaction are secondary hydroxyl groups.

It is preferred to tie up by reaction with monoepoxide all of the secondary carboxyl groups which are available in the interpolymer, but this is not essential. Thus, at least 20%, preferably at least 90% of the available secondary carboxyl groups are converted to hydroxy ester groups.

In the event that carboxyl groups are left unreacted, one may tolerate the limited storage stability of the copolymer or, if desired, this carboxyl functionality may be tied up by reaction with any monofunctional basic compound such as ammonia or a secondary amine.

While the interpolymers of the invention are useful alone in organic solvent solution coating compositions, they are preferably utilized in conjunction with another film-forming resin having functional groups such as carboxyl groups, oxirane groups, methylol groups or amine groups which are reactive with the hydroxy group which is formed in the interpolymers under consideration.

It is especially preferred to cure the hydroxy interpolymers of the invention with aminoplast resins or polyepoxide resins, or by a combination of both.

Particularly advantageous results are obtained when the hydroxy-containing interpolymers of the invention are blended with aminoplast resin and polyepoxide resin.

Appropriate proportions are 40–90 parts by weight of hydroxy-containing interpolymer to 5–40 parts of aminoplast resin to 5–40 parts of polyepoxide resin.

The present invention is especially directed to coating compositions which cure to provide very hard and mar-resistant coatings which, despite their hardness, are flexible and reasonably resistant to impact. For this purpose, the interpolymers of the invention which cure extensively and which possess good compatibility are used in combination with aminoplast resins, especially heat-hardening, solvent-soluble condensation products of a triazine with excess formaldehyde. As is well known, solvent solubility is usually provided by etherifying the aminoplast resin with a $C_3$–$C_8$ alcohol, preferably butanol.

Any resinous polyepoxide may be employed to cure the interpolymers of the invention or to modify the cure thereof with aminoplast resins. Preferably, the polyepoxide is a polyglycidyl ether of a polyhydric organic compound, preferably a dihydric phenol, and most preferably a bisphenol such as diglycidyl ethers of 2,2′-bis-(p-hydroxyphenylpropane) having average molecular weights of from about 360 to about 7,000. The polyepoxide provides enhanced flexibility and adhesion to a metal base while only slightly detracting from the hardness of baked films, such hardness being in part due to the large proportion of styrene or similar monomer in the interpolymer and in part due to the high compatibility with aminoplast resins and the excellent cure provided by the interaction of the aminoplast resin with the interpolymer.

One important disadvantage of curing systems containing aminoplast resins and/or polyepoxides with the hydroxy interpolymers of the invention, and which is a difficulty even when known hydroxy copolymers are used with aminoplast resins or polyepoxides, is the limited storage stability of the system necessitating reasonably prompt utilization or two-package systems.

As a feature of the invention, the interpolymer is converted to its hydroxy ester form in the presence of alkali metal acid salt, especially alkali metal fatty acid soaps, as esterification catalyst. Any alkalinity so-introduced is preferably removed by neutralization with acid, desirably inorganic acid.

Any alkali metal such as sodium, potassium or lithium may be used. Similarly, any organic monofunctional carboxylic acid may be used including acetic acid, stearic acid, or benzoic acid, but it is preferred to use the long chain unsaturated fatty acids derived from drying and semi-drying oils. Sodium oleate illustrates a particularly preferred soap.

The preferred neutralizing acids are mineral acids such as phosphoric and sulphuric acid, but the selection of the acid does not appear to be material.

The soaps are used in small catalytic amount, e.g., from 0.001%–5%, preferably from 0.005%–0.5%, based on the weight of the hydroxy interpolymer which is formed.

The invention is illustrated in the examples which follow:

EXAMPLE 1

A valuable non-gelled solvent-soluble hydroxy copolymer containing 39.5% of vinyl toluene, 31.0% of the coreaction product of maleic anhydride, n-butanol and propylene oxide, and 29.5% of ethyl acrylate is produced as follows:

*Charge composition**

|   | Grams |
|---|---|
| Aromatic hydrocarbon solvent, boiling range of 145–195° C. | 400 |
| Vinyl toluene | 480 |
| Ethyl acrylate | 360 |
| Maleic anhydride | 160 |
| Di-tert-butyl peroxide | 5 |
| Benzoyl peroxide | 5 |
| n-Butyl alcohol | 330 |
| Propylene oxide | 100 |
| Benzyl trimethyl ammonium chloride (60% solution in water) | 10 |
| Xylol | 580 |

* Proportions are based on materials charged and are applicable to the final product within ±1%.

*Procedure of polymerization*

The vinyl toluene-maleic anhydride-ethyl acrylate terpolymer is prepared by charging into a reactor equipped with an agitator, thermometer, nitrogen inlet tube and reflux condenser, 400 grams of aromatic hydrocarbon solvent having a boiling range of 145–195° C. The contents of the reactor are heated to 280–290° F.

A monomer-catalyst solution consisting of 160 grams of maleic anhydride dissolved in 480 grams of vinyl toluene and 360 grams of ethyl acrylate together with 5 grams of di-tert-butyl peroxide and 5 grams of benzoyl peroxide, as catalysts, is added dropwise through a dropping funnel to the hot solvent over a period of three hours while maintaining the temperature at light reflux. After the monomer-catalyst addition is completed, the reactor contents are held for an additional three hours at 285–295° F. The product is then cooled to 230° F. and 330 grams of n-butyl alcohol and 10 grams of 60% benzyl trimethyl ammonium chloride solution in water are added.

The contents of the reactor are reheated to 230° F. and 100 grams of propylene oxide are added over a 60 minute period from a separatory funnel.

After refluxing for three hours, the acid value of the interpolymer decreases from 51.0 to 16.2.

When an acid value of 15–17 is reached, the product is cooled to 200° F., filtered, and diluted with 580 grams of xylol.

The following constants are obtained:

| | |
|---|---|
| Percent solids | 49.5 |
| Viscosity (Gardner-Holdt) | V–W |
| Color (Gardner) | 1–2 |
| Acid number of solids | 16.2 |

EXAMPLE 2

The hydroxy containing copolymers of the present invention may be mixed with other resinous materials such as butylated melamine resins and epoxy resins, to form compatible blends which cure upon heating to provide films possessing outstanding physical properties such as hardness, mar resistance, gloss, adhesion and flexibility. The blends are also chemically resistant to solvents, greases, soaps and detergents.

An enamel of the above type which is particularly useful as a finish for refrigerators, washers, driers and kitchen cabinets, is prepared having the following composition:

| | Percent |
|---|---|
| Percent pigment | 28 |
| Percent non-volatile resin | 32 |

*Composition of non-volatile resin*

| | Percent |
|---|---|
| Interpolymer of Example 1 | 55 |
| Epoxy resin (Note 1) | 20 |
| Butylated melamine-formaldehyde resin (Note 2) | 25 |

(Note 1).—The epoxy resin is a substantially diglycidyl ether of 2,2′-bis(p-hydroxyphenylpropane) having a molecular weight of about 1000, an epoxide equivalent weight of about 500 (grams per epoxide equivalent weight), and a melting point of from 65–75° C.

(Note 2).—The butylated melamine-formaldehyde resin is a heat-hardenable solvent-soluble melamine-formaldehyde condensate etherified with butanol to provide solvent solubility and is employed in the form of a 55% by weight resin solids solution containing 25% butanol and 20% xylol. The melamine-formaldehyde resin is provided by heat reacting 5.5 mols of formaldehyde with 1 mol of melamine in the presence of excess butanol and a small amount of acid catalyst.

Procedure of preparation

| Lbs. | Gals. | | |
|------|-------|---|---|
| 298 | 8.5 | Titanium dioxide | Grind to 7½ N.S. gauge reading in pebble mill. |
| 150 | 18.6 | Interpolymer of Example 1 | |
| 50 | 7.0 | Xylol | |
| 229 | 28.6 | Interpolymer of Example 1 | Add. |
| 130 | 14.4 | Epoxy Resin of Note 1 (50% solution in 2-ethoxy ethanol acetate). | |
| 155 | 18.5 | Butylated melamine-formaldehyde Resin of Note 2. | |
| 53 | 7.3 | Xylol | |
| 1,065 | 102.0 | | |

Three mil thick wet films are drawn on chromate treated steel panels and baked for 20 minutes at 325° F. The following results are obtained:

Pencil hardness _____ 4H.
Gloss reading (Photovolt 60°) _____ 90.
Mar resistance _____ Very good.
Impact
    Forward _____ 50 inch/lbs.
    Reverse _____ 20 inch/lbs.
Flexibility _____ Pass ⅛" mandrel.
Toluol resistance _____ Very good.

A cure study was undertaken with respect to the enamel of the present example to determine the physical properties associated with different bake schedules. It was found that this system presents desirable overcuring and undercuring safety margins when considering conventional curing cycles (20 minutes at 325° F.), and does not require any additional catalyst to produce a thermosetting finish.

The curing safety margin is well illustrated in the table which follows:

Various combinations of hydroxylated terpolymer with epoxy resin and methylolated-butylated melamine resin have produced enamels with a wide range of physical properties and resistance characteristics.

As can be seen from the following examples higher levels of melamine resin result in enamels with greater hardness and chemical resistance, but which are less flexible.

Incorporation of a proportion of epoxy resin results in greater flexibility and well balanced overall properties. By increasing the proportion of epoxy resin, greater flexibility and improved corrosion resistance are achieved. The latitude of physical and chemical properties offered by the hydroxylated terpolymer systems gives the formulator many excellent opportunities to formulate numerous desirable coating solutions.

Four enamels which are particularly useful as appliance finishes are prepared as described in Example 2, having the following composition:

Percent
Non-volatile resin _____ 32
Titanium dioxide _____ 28

Three mil wet films are applied on chromate treated steel panels and baked for 20 minutes at 325° F. The following results are obtained:

| | Example 3 | Example 4 | Example 5 | Example 6 |
|---|---|---|---|---|
| Ingredient (Percent Solid Resin): | | | | |
|   Terpolymer of Ex. 1 | 70% | 55% | 65% | 65%. |
|   Epoxy resin (Note 1 of Ex. 2) | 15% | 10% | 20% | 15%. |
|   Melamine-formaldehyde Resin (Note 1 of Ex. 2) | 15% | 35% | 15% | 10%. |
|   Urea resin (Note 3) | | | | 10%. |
| Final Physical Properties: | | | | |
|   Pencil Hardness | 3H | 4H | 4H | 3H. |
|   Gloss reading (photovolt 60°) | 87 | 89 | 84 | 85. |
|   Mar resistance | Very good | Very good | Very good | Very good. |
|   Impact: | | | | |
|     Forward | 50 | 30 | 50 | 40. |
|     Reverse | 20 | 5 | 20 | 20. |
|   Flexibility (Mandrel bend) | Pass ⅛" | Pass ⅛" | Pass ⅛" | Pass ⅛". |

(Note 3).—The urea resin utilized is a solution of 60% resin solids of the heat-hardenable reaction product of urea with formaldehyde in a solvent consisting of butanol/xylol (weight ratio 20/30), having a viscosity of L–Q (Gardner-Holdt at 25° C.), and an acid number of 3–8 (computed on resin solids). One mol of urea is reacted with 2 mols of formaldehyde under alkaline conditions to form a resinous condensation product when it is then etherified with one mol of butanol in the presence of a trace of phosphoric acid.

EXAMPLE 7

The hydroxy terpolymer of Example 1 is formulated into an appliance white enamel using the following non-volatile composition:

Percent
Pigment—100% titanium dioxide _____ 27
Non-volatile resin _____ 31
Terpolymer of Example 1 _____ 65
Melamine-formaldehyde resin (Note 2 of Ex. 2) ____ 20
Epoxy resin (Note 1 of Ex. 2) _____ 15

TABLE I.—CURE STUDY OF ENAMEL OF EXAMPLE 2

| | Gloss reading (photovolt 60°) | Mar resistance | Pencil hardness | Impact forward | ⅛" mandrel flexibility | Toluol resistance |
|---|---|---|---|---|---|---|
| 300° F.: | | | | | | |
|   15 minutes | 89 | Good | 3H | 30 | Pass | Good. |
|   20 minutes | 87 | do | 3H | 30 | do | Do. |
|   25 minutes | 87 | do | 4H | 30 | do | Do. |
| 325° F.: | | | | | | |
|   15 minutes | 89 | Very good | 4H | 30 | do | Do. |
|   20 minutes | 89 | do | 4H | 50 | do | Very good. |
|   25 minutes | 89 | do | 4H | 30 | do | Do. |
|   30 minutes | 89 | do | 4H | 30 | do | Do. |
| 350° F.: | | | | | | |
|   10 minutes | 89 | Good | 4H | 30 | do | Do. |
|   15 minutes | 90 | Very good | 4H | 30 | do | Do. |
|   20 minutes | 89 | do | 4H | 30 | do | Do. |
|   25 minutes | 89 | do | 4H | 30 | do | Do. |
|   30 minutes | 89 | do | 4H | 30 | do | Do. |

The enamel is drawn down over primed zinc phosphate treated panels and cured at 325° F. for twenty minutes to obtain the following results:

| | |
|---|---|
| Pencil hardness | 3H–4H. |
| Detergent resistance | Very good. |
| Stain resistance: | |
|     Lipstick | No stain. |
|     5% acetic acid | No stain. |
|     1/10 N hydrochloric acid | Very slight stain. |
|     Mustard | Very slight stain. |
|     Iodine | Very slight stain. |
| Flexibility (conical mandrel) | Pass 1/8". |
| Impact resistance (forward) | Pass 20 inch/lbs. |
| Abrasion resistance (average milligrams lost 100 cycles) | 10 mgs. |
| Salt spray resistance 504 hours at 100° F., 5% salt solution | Excellent (less than 1/32" creepage). |

Stain resistance, hardness, flexibility, detergent, salt and abrasion resistance are much superior to conventional alkyd-amine finishes.

The recoat adhesion is checked in an electric oven. The bake schedule is twenty minutes at 330° F. Panels are recoated one hour after initial bake.

The enamel of the present example has excellent recoat adhesion measured by the above test.

Baked coatings produced in the present example are extremely hard and glossy, with outstanding resistance to soaps, detergents and staining. They have excellent gloss and color retention on aging and very good retention of color on overbake.

The excellent compatibility of the hydroxy interpolymers of the present invention with aminoplast resins and epoxy resins permits the tailoring of enamels to meet a great variety of needs.

EXAMPLE 8

A non-gelled solvent-soluble hydroxy interpolymer of the following composition:

| | Percent |
|---|---|
| Vinyl toluene | 44.1 |
| Ethyl acrylate | 30.5 |
| Maleic anhydride | |
| n-Butyl alcohol | 25.4 |
| Propylene oxide | | is produced as follows:

*Charge composition (parts by weight)*

| | Grams |
|---|---|
| Aromatic hydrocarbon solvent (boiling range 145–195° C.) | 660 |
| Vinyl toluene | 520 |
| Ethyl acrylate | 360 |
| Maleic anhydride | 120 |
| Di-tert-butyl peroxide | 5 |
| Benzoyl peroxide | 5 |
| n-Butyl alcohol | 180 |
| Propylene oxide | 90 |
| Benzyl trimethyl ammonium chloride (60% solution in water) | 10 |
| Xylol | 400 |

*Procedure of polymerization*

The vinyl toluene-maleic anhydride-ethyl acrylate interpolymer is prepared by charging into a reactor equipped with an agitator, thermometer, nitrogen inlet tube and reflux condenser, 660 grams of aromatic hydrocarbon solvent having a boiling range of 145–195° C. The contents of the reactor are heated to 280–290° F. Then 120 grams of maleic anhydride are dissolved in 520 grams of vinyl toluene and 360 grams of ethyl acrylate and to this mixture 5 grams of di-tert-butyl peroxide and 5 grams of benzoyl peroxide are added.

The above monomer-catalyst solution is then added drop-wise over a three hour period to the hot solvent, while maintaining the temperature at light reflux. After the monomer-catalyst addition is complete, the contents of the reactor are heated for an additional three hours at 290° F. The product is then cooled to 230° F. and butyl alcohol and benzyl trimethyl ammonium chloride are added. The contents of the reactor are reheated to 230° F. and propylene oxide is added over a period of 90 minutes.

After a three hour period at 220–230° F., the acid value decreases to 16.0, and the product is cooled to 200° F., filtered, and diluted with 400 grams of xylol.

The final characteristics of the interpolymer are as follows:

| | |
|---|---|
| Solids (percent) | 50.1 |
| Color (Gardner) | 1–2 |
| Viscosity (Gardner-Holdt) | T–U |
| Acid value of solids | 16.0 |

The hydroxyl-containing interpolymer of the present example is combined with butylated melamine-formaldehyde resins, epoxy resins, and epoxy esters to provide thermosetting film-forming products which possess outstanding physical and chemical properties.

Three enamels which are particularly useful as coatings for appliance finishes are prepared using the same grinding procedure described in Example 2.

The enamels have the following composition:

| | |
|---|---|
| Non-volatile resin | percent__ 32 |
| Titanium dioxide | do____ 28 |

Three mil wet films are applied on chromate treated steel panels and baked for 20 minutes at 325° F.

The following results are obtained:

| | Example 9 | Example 10 | Example 11 |
|---|---|---|---|
| Ingredient (percent solid resin): | | | |
|   Interpolymer of Example 8. | 75% | 70% | 70%. |
|   Melamine-formaldehyde resin (Note 2 of Ex. 2). | 25% | 20% | 20%. |
|   Epoxy resin (Note 1 of Ex. 2). | | 10% | |
|   Epoxy ester (Note 4) | | | 10%. |
| Final physical properties: | | | |
|   Pencil hardness | 3H | 2H–3H | 2H. |
|   Gloss reading (photovolt 60°). | 92 | 91 | 90. |
|   Mar resistance | Very good | Very good | Good. |
|   Impact (forward) | 20 | 30 | 40. |
|   Flexibility (mandrel bend). | Pass 1/8" | Pass 1/8" | Pass 1/8". |
|   Toluol resistance | Very good | Very good | Good. |

(Note 4).—The epoxy ester consists of 60% by weight of an epoxy resin which is a substantially diglycidyl ether of 2,2'-bis(p-hydroxyphenylpropane) having a molecular weight of about 3800, an epoxy value of 0.05 equivalents/100 grams and a melting point of from 127–133° C. and 40% by weight of dehydrated castor fatty acids. The epoxy ester is prepared by charging the reactants into a reactor along with 2% xylol. The mixture is heated to 480° F. until an acid number of about 10 is reached. The product is diluted to 50% solids with xylol/butanol (1:1).

Numerous unsaturated materials can be utilized in the formation of the interpolymers of the invention. The following examples illustrate the use of an unsaturated carboxyl terminated polyester in the formation of the interpolymers of the invention.

EXAMPLE 12

*Interpolymer composition*

| | Percent |
|---|---|
| Unsaturated polyester "A" (see Note 5) | 30 |
| Styrene | 42 |
| Ethyl acrylate | 12 |
| Maleic anhydride | 16 |
| | 100 |

*Charge composition*

| | Grams |
|---|---|
| Butanol | 150 |
| Xylol | 800 |
| Polyester A (80% solids) | 400 |
| Styrene | 420 |
| Maleic anhydride | 160 |
| Ethyl acrylate | 120 |
| Tert-butyl perbenzoate | 15 |
| Butanol | 130 |
| Benzyl trimethyl ammonium chloride (60% solution in water) | 12 |
| Propylene oxide | 135 |
| Butanol | 200 |

(Note 5).—The unsaturated carboxyl terminated polyester A is the polyesterification reaction product of 180 grams of crotonic acid; 1200 grams of diethylene glycol; 635 grams of adipic acid and 635 grams of phthalic anhydride, having an acid value of 35–40, 79% solids in xylol and a viscosity (Gardner-Holdt scale at 25° C.) of P.

*Procedure of preparation*

The interpolymer is prepared by charging 150 grams of butanol and 800 grams of xylene into a reactor equipped with an agitator, thermometer, nitrogen inlet tube and reflux condenser. The contents of the reactor are heated to 270–280° F.

The maleic anhydride is dissolved in the styrene and the ethyl acrylate and 400 grams of polyester A are added. To this mixture, 15 grams of tertiary butyl perbenzoate are added. This monomer-catalyst solution is then added dropwise through a dropping funnel to the hot solvent over a period of three hours while maintaining light reflux. After the monomer-catalyst addition is complete, the reactor contents are heated for an additional 3 hours at 280–290° F. The product is then cooled to 230° F. and 130 grams of butanol and 12 grams of trimethyl benzyl ammonium chloride (60% solids) are added. The contents of the reactor are held at reflux and the propylene oxide is added over a 90 minute period from a separatory funnel.

After three hours of refluxing, the acid value of the interpolymer drops from 82 to 10.8. When an acid value of 10–12 is reached, the product is cooled to 200° F., diluted with 200 grams of butanol and filtered.

The following constants are obtained:

| | |
|---|---|
| Percent solids _____percent_ | 50.1 |
| Viscosity (Gardner-Holdt) | V |
| Color (Gardner) | 2 |
| Acid number of solids | 10.8 |

EXAMPLE 13

The interpolymer of Example 12 is evaluated as an enamel useful as an appliance finish. The enamel is prepared using the same grinding procedure described in Example 2, and contains the following non-volatile composition:

| | Percent |
|---|---|
| Interpolymer resin of Example 12 | 65 |
| Butylated melamine-formaldehyde resin (Note 2 of Ex. 2) | 20 |
| Epoxy resin (Note 1 of Ex. 2) | 15 |

Three mil thick wet films are drawn on chromate treated steel panels and baked for 20 minutes at 325° F. The following results are obtained:

| | |
|---|---|
| Pencil hardness | 3H. |
| Gloss reading (photovolt 60°) | 92. |
| Mar resistance | Very good. |
| Impact (forward) | Pass 30 inch/pounds. |
| Flexibility | Pass ⅛" mandrel. |
| Toluol resistance | Excellent. |

This enamel does not require any additional catalyst to produce a thermosetting finish.

EXAMPLE 14

The preparation of an hydroxy interpolymer utilizing an unsaturated polyester resin containing free carboxyl groups, is illustrated below:

*Interpolymer composition*

| | Percent |
|---|---|
| Vinyl toluene | 48 |
| Unsaturated polyester "B" (see Note 6) | 10 |
| Ethyl acrylate | 26 |
| Maleic anhydride | 16 |
| | 100 |

(Note 6).—Polyester "B" is the polyesterification reaction product of 135 parts of maleic anhydride; 690 parts of adipic acid, 660 parts phthalic anhydride; 234 parts 2-ethyl hexanol and 1386 parts of diethylene glycol, having an acid value of 35, 78% solids in xylol and a viscosity (Gardner-Holdt at 25° C.) of G.

*Charge composition*

| | Grams |
|---|---|
| Unsaturated polyester "B" | 125 |
| 2-butoxy ethanol | 75 |
| Aromatic hydrocarbon solvent (distillation range 300–380° F.) | 400 |
| Xylol | 450 |
| Vinyl toluene | 480 |
| Ethyl acrylate | 260 |
| Maleic anhydride | 160 |
| Tertiary butyl perbenzoate | 15 |
| n-Butyl alcohol | 260 |
| Benzyl trimethyl ammonium chloride (60% solution in water) | 12 |
| Propylene oxide | 120 |
| Xylol | 130 |

The same procedure of preparation is used as described in Example 12, to provide an interpolymer having the following final characteristics:

| | |
|---|---|
| Solids (percent) | 51.0 |
| Viscosity (Gardner-Holdt) | V–W |
| Color (Gardner) | 1–2 |
| Acid value (non-volatile) | 15.1 |

The interpolymer of the present example is combined with melamine-formaldehyde resins, alkyd resins and epoxy resins. Three further enamels which are particularly useful as coatings for appliance finishes are prepared using the same grinding procedure described in Example 2.

The enamels have the following composition:

| | Percent |
|---|---|
| Non-volatile resin | 32 |
| Titanium dioxide | 28 |

Three mill wet films are applied on chromate treated steel panels and baked for 20 minutes at 325° F.

The following results are obtained:

| Ingredients (percent solid resin): | Example 15 | Example 16 | Example 17 |
|---|---|---|---|
| Interpolymer of Example 14 | 80% | 65% | 65% |
| Melamine-formaldehyde resin (Note 2 of Ex. 2) | 20% | 20% | 20% |
| Epoxy resin (Note 1 of Ex. 2) | | 15% | |
| Castor oil alkyd resin (see Note 7) | | | 15% |
| Final physical properties: | | | |
| Pencil hardness | 3H | 2H | 2H. |
| Gloss reading (photovolt 60°) | 93 | 92 | 92. |
| Mar resistance | Excellent | Very good | Very good. |
| Flexibility (mandrel bend) | Pass 3/4" | Pass 1/8" | Pass 1/8". |
| Impact (forward) | 25 in./lbs. | 30 in./lbs. | 30 in./lbs. |
| Toluol resistance | Excellent | Excellent | Excellent. |

(Note 7).—The castor oil alkyd resin is the polyesterification reaction product of 33.8% dehydrated castor oil, 39% phthalic anhydride, 25.5% glycerine and 1.7% benzoic acid prepared by heating the castor oil, 11 parts of glycerine and 0.03 part of lead oxide to 450° F., until the product is soluble in an equal volume of methyl alcohol, cooling the resulting product to 380° F., and adding to the cooled product phthalic anhydride, benzoic acid and 14.5 parts of glycerine, and heating to 420° F. until the acid value is reduced to 6.

The reaction of the copolymer half ester with monoepoxide is desirably catalyzed by an alkali metal organic acid salt, especially by alkali metal fatty acid soaps. When the reaction is complete, the alkali metal salt or soap is neutralized with an inorganic acid such as phosphoric, sulfuric or hydrochloric acids. Hydroxy interpolymers prepared utilizing this catalyst system have excellent shelf stability in the coating formulations containing melamine or polyepoxide resins. In contrast, polyhydroxy polymers prepared with an amino or a quaternary salt catalyst have only limited shelf stability.

The preparation of hydroxy interpolymers of maleic anhydride-vinyl toluene-alkyl acrylate, utilizing alkali metal soap as catalyst for the epoxy-acid reaction is illustrated in the following examples:

EXAMPLE 18

*Charge composition*

| | Grams |
|---|---|
| Aromatic hydrocarbon solvent (boiling range of 145–195° C.) | 400 |
| Vinyl toluene | 480 |
| Ethyl acrylate | 360 |
| Maleic anhydride | 160 |
| Di-tert-butyl peroxide | 5 |
| Benzoyl peroxide | 5 |
| n-Butyl alcohol | 330 |
| Propylene oxide | 120 |
| Sodium oleate | 13 |
| Xylol | 580 |

*Procedure of polymerization*

The vinyl toluene-maleic anhydride-ethyl acrylate interpolymer is prepared by charging into a reactor equipped with an agitator, thermometer, nitrogen inlet tube and reflux condenser, 400 grams of aromatic hydrocarbon solvent having a boiling range of 145–195° C. The contents of the reactor are heated to 280–290° F.

160 grams of maleic anhydride are dissolved in 480 grams of vinyl toluene and 360 grams of ethyl acrylate. To this monomer mixture, as catalysts, are added 5 grams of di-tert-butyl peroxide and 5 grams of benzoyl peroxide. This monomer-catalyst solution is added dropwise through a dropping funnel to the hot solvent over a period of three hours while maintaining light reflux. After the monomer-catalyst addition is complete, the reactor contents are heated for an additional three hours at 285–295° F. The product is then cooled to 230° F. and 330 grams of n-butyl alcohol and 13 grams of sodium oleate are added.

The contents of the reactor are reheated to 230° F. and 120 grams of propylene oxide are added over a 90-minute period from a separatory funnel.

After refluxing for 3 hours, the acid value of the interpolymer decreases from 51.0 to 16.0.

When an acid value of 15–17 is reached, the product is cooled to 200° F. and 15 grams of 10% phosphoric acid in butanol are added and the product is filtered and diluted with 580 grams of xylol.

The following constants are obtained:

| | |
|---|---|
| Percent solids percent | 51.0 |
| Viscosity (Gardner-Holdt) | U–V |
| Color (Gardner) | 1–2 |
| Acid number of solids | 16.2 |

The resin of the present example is evaluated in an enamel particularly useful as an appliance finish, using the same grinding procedure described in Example 2. The enamel has the following composition:

| | Percent |
|---|---|
| Percent pigment (titanium dioxide) | 28 |
| Percent non-volatile resin | 32 |

*Composition of non-volatile resin*

| | Percent |
|---|---|
| Interpolymer of Example 18 | 55 |
| Epoxy resin (Note 1, Ex. 2) | 20 |
| Butylated melamine-formaldehyde resin (Note 2, Ex. 2) | 25 |

Three mil thick wet films are drawn on chromate pretreated steel panels and baked for 20 minutes at 325° F.

The following results are obtained:

| | |
|---|---|
| Pencil hardness | 3H–4H. |
| Gloss reading (photovolt 60°) | 90. |
| Mar resistance | Very good. |
| Impact | |
| Forward | Pass 30 inch/lbs. |
| Reverse | Pass 15 inch/lbs. |
| Flexibility | Pass 1/8" mandrel |
| Toluol resistance | Very good. |

EXAMPLE 19

Example 18 is repeated, using 310 grams of phenyl glycidyl ether in place of the 120 grams of propylene oxide utilized in Example 18, to provide an interpolymer having the following final characteristics:

| | |
|---|---|
| Percent solids percent | 49.7 |
| Viscosity (Gardner-Holdt) | S–T |
| Color (Gardner) | 1–2 |
| Acid value of solids | 15.4 |

*Stability evaluation*

The storage stability of enamels prepared with a combination of polyhydroxy interpolymer, melamine resin, and diepoxide resin is poor when an amine or quaternary ammonium salt is used in the preparation of the hydroxy polymers. When an hydroxy polymer is prepared using an alkali metal fatty acid soap followed by phosphoric acid neutralization, the stability of the enamels is found to be excellent as is shown in the comparison reported below.

For stability evaluation, pigmented and unpigmented coating compositions are prepared using the following non-volatile resin ratios:

| | Percent |
|---|---|
| Polyhydroxy interpolymer of the composition of Example 18, but with different catalysts | 65 |
| Butylated melamine-formaldehyde resin (Note 2, Ex. 2) | 20 |
| Epoxy resin (Note 1, Ex. 2) | 15 |

*Interpolymer of Example 18*

|  | A | B | C |
|---|---|---|---|
| Catalyst used for reaction | Benzyl trimethyl ammonium chloride | Triethylamine | Sodium oleate- phosphoric acid |
| Stability of enamel (32% total non-volatile resin) pigmented with 28% titanium dioxide at 130° F. Viscosity (seconds—Zahn #4 cup): | | | |
| Initial viscosity | 65 | 57 | 60 |
| 48 Hours | 110 | 115 | 72 |
| 72 Hours | 160 | 170 | 84 |
| 120 Hours | 200 | 215 | 95 |
| 160 Hours | (¹) | (¹) | 102 |
| Stability of clear enamel with 32% total non-volatile resin at 130° F. Viscosity (std. poise): | | | |
| Initial viscosity | 9 | 8 | 6 |
| 24 Hours | 24 | 27 | 6.2 |
| 48 Hours | 60 | 58 | 6.5 |
| 72 Hours | (²) | (²) | 7.2 |
| 120 Hours | | | 8.1 |
| 160 Hours | | | 8.7 |

¹ Gelled (solid).
² Gelled.

The invention is defined in the claims which follow:

I claim:

1. A method of producing a solvent-soluble non-gelled interpolymer containing a maleic anhydride hydroxy ester interpolymerized therein comprising, reacting a preformed anhydride-containing addition interpolymer of a maleic anhydride with ethylenically unsaturated material copolymerizable therewith with monohydric aliphatic organic compound containing a single hydroxyl group as the sole functional group thereof to partially esterify anhydride groups and thereby form secondary carboxyl groups, and reacting said secondary carboxyl groups in the presence of excess monohydric aliphatic organic compound with organic monoepoxide containing a single oxirane group as the sole functional group thereof, said monohydric compound being reacted with said copolymer to an extent of from 90–110% of half esterification of the anhydride groups of said copolymer, and said monoepoxide being reacted with at least 20% of the secondary carboxyl groups made available by reaction with said monohydric compound.

2. A method as recited in claim 1 in which said preformed anhydride-containing addition copolymer comprises a maleic anhydride and ethylenically unsaturated compound selected from the group consisting of styrene, vinyl toluene and methyl methacrylate.

3. A method as recited in claim 1 in which said monoepoxide is selected from the group consisting of ethylene oxide, propylene oxide, butylene oxide, styrene oxide and phenyl glycidyl ether.

4. A method as recited in claim 1 in which maleic anhydride comprises from 5–30% by weight of said interpolymer.

5. A method as recited in claim 1 in which at least 90% of said available secondary carboxyl groups are reacted with said monoepoxide.

6. A method of producing a solvent-soluble non-gelled interpolymer containing a maleic anhydride hydroxy ester interpolymerized therein comprising, reacting a preformed anhydride-containing addition interpolymer of a maleic anhydride with ethylenically unsaturated material copolymerizable therewith containing from 2–50% by weight of a maleic anhydride with monohydric alcohol selected from the group consisting of alkanols and ether alcohols containing at least two carbon atoms, and containing a single hydroxyl group as the sole functional group thereof to partially esterify anhydride groups and thereby form secondary carboxyl groups, and reacting said secondary carboxyl groups in the presence of excess monohydric aliphatic organic compound with organic monoepoxide containing a single oxirane group as the sole functional group thereof, said monohydric alcohol being reacted with said copolymer to an extent of from 90–110% of half esterification of the anhydride groups of said copolymer, and said monoepoxide being reacted with at least 90% of the secondary carboxyl groups made available by reaction with said monohydric alcohol.

7. A method as recited in claim 6 in which said preformed anhydride-containing addition interpolymer comprises a maleic anhydride and ethylenically unsaturated compound selected from the group consisting of styrene, vinyl toluene and methyl methacrylate.

8. A method as recited in claim 7 in which said interpolymer further comprises from 20–45% of alkyl acrylate based on the total weight of polymerizable monomers in said interpolymer.

9. A method as recited in claim 7 in which said interpolymer further includes copolymerized unsaturated polyester resin containing from 0.005 to 0.40 gram mol of ethylenically unsaturated component per 100 grams of polyester.

10. A method as recited in claim 6 in which maleic anhydride comprises from 5–30% by weight of said interpolymer.

11. A method of producing a storage-stable, solvent-soluble non-gelled interpolymer containing a maleic anhydride hydroxy ester interpolymerized therein comprising, reacting a preformed anhydride-containing addition interpolymer of a maleic anhydride with ethylenically unsaturated material copolymerizable therewith with monohydric aliphatic organic compound containing a single hydroxyl group as the sole functional group thereof to partially esterify anhydride groups and thereby form secondary carboxyl groups, and reacting said secondary carboxyl groups in the presence of excess monohydric aliphatic organic compound with organic monoepoxide containing a single oxirane group as the sole functional group thereof, said monohydric compound being reacted with said copolymer to an extent of from 90–110% of half esterification of the anhydride groups of said copolymer, and said monoepoxide being reacted with at least 20% of the secondary carboxyl groups made available by reaction with said monohydric compound, said reactions being conducted at elevated temperature in the presence of a catalytic proportion of alkali metal organic acid salt.

12. A method as recited in claim 11 in which the alkalinity introduced by said salt is removed by acid neutralization when said reactions have been completed.

13. A method as recited in claim 11 in which said organic salt is a fatty acid soap.

14. A method as recited in claim 13 in which said soap is sodium oleate and excess alkalinity introduced by said soap is removed by neutralization with mineral acid when said reactions have been completed.

15. A method as recited in claim 14 in which said mineral acid is phosphoric acid.

16. The product of the method of claim 1.

17. The product of the method of claim 11.

18. A method as recited in claim 6 in which excess alcohol and said monoepoxide are simultaneously reacted with said anhydride-containing addition interpolymer, both of said reactions being controlled by retention of water in the system.

References Cited by the Examiner

UNITED STATES PATENTS

| 2,681,897 | 6/1954 | Frazier et al. | 260—855 |
| 2,961,424 | 11/1960 | Muller et al. | 260—855 |
| 2,967,162 | 1/1961 | Vasta | 260—21 |
| 3,002,959 | 10/1961 | Hicks | 260—78.5 |
| 3,136,736 | 6/1964 | Washburne et al. | 260—837 |

LEON J. BERCOVITZ, *Primary Examiner.*

R. A. WHITE, *Assistant Examiner.*